(12) United States Patent
Erhardt et al.

(10) Patent No.: US 7,016,178 B2
(45) Date of Patent: Mar. 21, 2006

(54) CAPACITOR HOUSING

(75) Inventors: Werner Erhardt, Ballendorf (DE); Hubertus Goesmann, Auernheim (DE); Gerhard Niederberger, Gerstetten (DE); Stefan Nowak, Heubach (DE); Klaus Schoch, Nattheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/507,386

(22) PCT Filed: Mar. 4, 2003

(86) PCT No.: PCT/DE03/00688

§ 371 (c)(1),
(2), (4) Date: Jun. 14, 2005

(87) PCT Pub. No.: WO03/079464

PCT Pub. Date: Sep. 25, 2003

(65) Prior Publication Data

US 2005/0225926 A1    Oct. 13, 2005

(30) Foreign Application Priority Data

Mar. 13, 2002   (DE) .......................... 202 04 027 U

(51) Int. Cl.
*H01G 2/10* (2006.01)
*H01G 9/08* (2006.01)
(52) U.S. Cl. ...................... 361/517; 361/535
(58) Field of Classification Search ........ 361/517–521, 361/535–540
See application file for complete search history.

(56) References Cited

U.S. PATENT DOCUMENTS

| 3,463,969 | A | * | 8/1969 | Wershey .................... 361/521 |
| 4,213,004 | A | | 7/1980 | Acker et al. |
| 4,245,277 | A | * | 1/1981 | van Gils et al. ............ 361/521 |
| 4,577,257 | A | * | 3/1986 | Erhardt et al. .............. 361/272 |
| 6,856,502 | B1 | * | 2/2005 | Laurila et al. .............. 361/517 |

FOREIGN PATENT DOCUMENTS

| DE | 751 677 | 8/1953 |
| DE | 751677 | 8/1953 |
| EP | 0 685 895 | 6/1995 |
| EP | 1 039 564 | 9/2000 |
| FR | 2 585 185 | 7/1985 |

OTHER PUBLICATIONS

Translation of Claims from German DE751677.

* cited by examiner

*Primary Examiner*—Eric W. Thomas
(74) *Attorney, Agent, or Firm*—Fish & Richardosn P.C.

(57) ABSTRACT

A housing for an electrochemical cell having at least a first electrode and a second electrode. The housing includes a lid having a first indentation to contact the first electrode, and a bottom having a second indentation to contact the second electrode. The first indentation has a first cross-section and the second indentation has a second cross-section. The first cross-section and the second cross-section get narrower as the first indentation and the second indentation progress into an interior of the housing.

20 Claims, 4 Drawing Sheets

CAPACITOR HOUSING

BACKGROUND

Electrodes of electrochemical cells, such as capacitors or batteries, are frequently accommodated in cup-shaped housings. These housings are delimited by a bottom on one side and closed off with a lid on the other side. On the lid, there are generally two electrical connectors that serve for contacting the electrodes located in the interior of the cup-shaped housing. In this arrangement, conductors made of electrically conductive material are frequently either affixed to the electrodes, or projecting regions of the electrodes are trimmed in such a manner that projecting conductors are formed. These conductors are then connected with the electrical connectors either by means of screw connections (see FIG. 1A) or connected rigidly by means of welding. Such contact between the electrodes and the electrical connectors is difficult to implement and, therefore, very time-consuming and thus also costly in production.

In another variant of cup-shaped housings for electrochemical cells, the electrodes are contacted via indentations having a rectangular cross-section, which are, for example, arranged on the inside walls of the lid and the housing bottom. In this case, the potential of the one electrode is applied to the housing cup, which must be insulated electrically from the lid, which has the potential of the other electrode applied to it. As is evident in FIGS. 2A and 2B, these indentations contact projecting regions of the electrodes, whereby as a rule only a small contacting area is present between the indentations and the electrodes. Such contact points are furthermore also frequently welded using a laser, for example. Since the laser beam is frequently cone-shaped in the region of the indentation, it is weakened at the outer edges of the indentation in the case of rectangular indentations so a very low input of energy of the laser into the interior of the indentation results, so that the indentation might be only insufficiently welded to the electrode (see FIG. 2B, for example).

In this arrangement, in the case of capacitors and batteries, porous separators are frequently present between the two electrodes with different polarities, which separators are saturated with an electrolyte solution so that the two electrodes are in contact with the electrolyte solution.

Frequently, in the case of conventional housings, electrical insulations, e.g., plastic injection-molded parts, are present between the housing and the lid (see FIG. 1A, for example) if different potentials are applied to the lid and the housing. Furthermore, sealing rings are also present in this arrangement, which form a tight seal between the housing and the lid so that the electrolyte solution cannot get into the environment. Such embodiments require an accordingly long and therefore cost-intensive assembly because of their complicated structure.

SUMMARY

It is therefore the task of the present invention to provide a cup-shaped housing for electrochemical cells that allows particularly simple contacting between the electrodes and the lid as well as the housing.

This task is accomplished via a housing according to claim 1. Advantageous embodiments of the housing are the object of dependent claims.

The invention provides a cup-shaped housing for electrochemical cells having at least two electrodes, wherein the cup-shaped housing has a lid in which a first indentation, directed inwards, for contacting a first electrode, is formed, and in which a second indentation, directed inwards, for contacting a second electrode, is formed in the housing bottom. In this arrangement, the first and the second indentation have a cross-section that narrows into the interior of the housing.

The advantage of a housing according to the invention is that because of the narrowing cross-section of the first and second indentation, a much larger contact area between the indentation and the electrodes than in the case of conventional housings is the result. Furthermore, via this special shape of the indentation, a maximal non-positive lock between the indentation and the electrodes is achieved. Because the cross-section of the indentations narrows into the interior of the housing, it is furthermore easily possible to allow a high input of energy into the indentation in the case that the contact point is welded via a laser beam, for example, so that the electrodes are melted together with the indentations particularly well (see also FIG. 3B, for example).

In an advantageous embodiment of the housing, the first and the second indentation extend in a straight line over a large portion of an expanse direction of the lid and of the housing bottom. A housing structured in such a manner has the advantage that via the spatial expanse of the indentation, a particularly large contact area between the indentations and the electrodes is created.

In another variant of the housing according to the invention, the first and the second indentation are each formed by a separate component affixed to the inside of the lid or to the inside of the housing bottom, respectively. This can be done via welding or riveting, for example.

The material of housings according to the invention can comprise, for example, a number of aluminum alloys, for example aluminum 99.5 or aluminum 99.9, as well as aluminum forging alloys. The advantage of these materials is that they have good electrical conductivity, for one thing, so that the potential of the electrodes can be applied to them well, and that for another thing, they demonstrate good deformation properties, so they can be worked easily, hot or cold, for example via extrusion. In the case of housings according to the invention, made of this material, it is possible, for example, to form the first and second indentation via extrusion. In this manner, the indentations can advantageously be formed in one step with the housing and with the lid.

In another advantageous embodiment of a housing according to the invention, an electrically insulating component made in one piece is present that runs circumferentially around the lid and is arranged in a sealed manner between the lid and the wall of the housing (see FIG. 4A). Via this electrically insulating component, housings according to the invention can be sealed in a particularly simple manner, and, at the same time, the lid can be insulated electrically from the housing. Thus two functions (seal and electrical insulation) are integrated in a single component, in a particularly advantageous manner.

In contrast to conventional seals and insulations, which consist of two components, a particularly simple assembly of a housing according to the invention can be guaranteed by the one-piece electrically insulating component according to the invention, in the region of the lid.

In another embodiment, first regions of the electrically insulating component are arranged circumferentially around the lid, outside of the housing interior, whereby they have a notch into which the edge of the housing, towards the housing interior, is turned over circumferentially. In this arrangement, these regions with the notch allow particularly simple flanging of the housing and therefore a particularly reliable seal.

In this arrangement, the electrically insulating component can comprise rubber, e.g., acryl/nitrile/butadiene rubber.

In another embodiment, the invention describes an electrochemical cell that is a capacitor and, in this arrangement, has a cup-shaped housing according to the invention. A layer stack that comprises the first and the second electrode, formed as electrode layers in this case, is accommodated in the interior of the housing. Under some circumstances, a flat separator saturated with an electrolyte solution can be located between the electrode layers. The faces of the layer stack lie opposite the lid and the housing bottom, respectively (see FIG. 3A, for example). At the faces of the layer stack, edge regions of either the first or the second electrode layer, respectively, project and are turned over at the contact points with the indentations to increase the contact area. This means that regions of the first electrode layer project out of the top face of the layer stack, for example, and regions of the second electrode stack project out of the face that lies opposite the housing bottom (see FIG. 3A). The indentation located on the inside of the lid then contacts the projecting regions of the first electrode layer so that the potential of the first electrode layer is applied to the lid. The indentation formed in the housing bottom then contacts the projecting regions of the second electrode layer so that the potential of the second electrode layer is applied to the housing cup.

It is advantageous if the contact points between the indentations and the electrode layers are welded. In this case, a particularly intimate contact between the indentations and the electrode layers is the result. In this arrangement, the contact layers can be laser-welded. Because of the particular cross-sectional shape of the indentations, which narrows into the interior of the housing, a particularly high input of energy can be transferred at the weld points by laser beam so that particularly good welding can take place using a laser beam. The layer stack described here can also be rolled up to form a capacitor winding in this arrangement.

In the following, the invention will be explained in greater detail, using exemplary embodiments and figures.

DETAILED DESCRIPTION

Figure 1A:
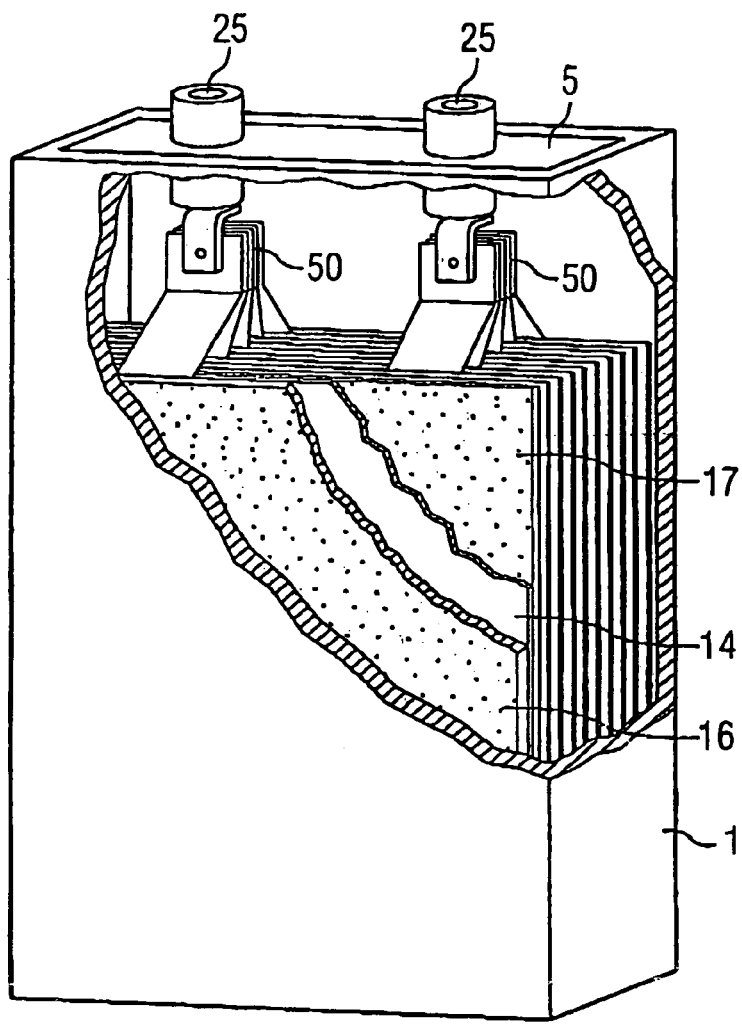
FIG. 1A shows a conventional capacitor that contains a layer stack that comprises electrode layers.
Figure 1B:
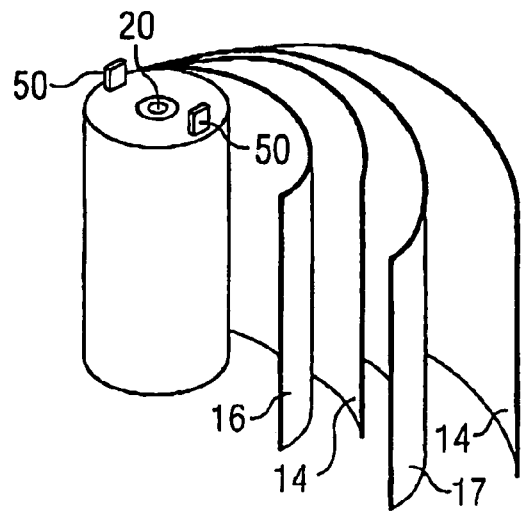
FIG. 1B shows a conventional capacitor winding that can be accommodated in a housing.

FIG. 1A shows a capacitor with a conventional housing. In the capacitor housing 1, there is a layer stack that consists of a first electrode layer 16, a second electrode layer 17, and a separator 14 located between them. The separator is usually impregnated with an electrolyte solution. On the lid 5 of the housing 1, there are electrical connectors 25, which contact the first and second electrode layer, respectively, by way of conductors 50, which are attached to the electrode layers. Such contacting of the electrical connectors with the electrode layers can only be implemented with a great deal of effort, as already described above.

Instead of the layer stack shown in FIG. 1A, a capacitor winding can also be introduced into the housing. In this arrangement, a first electrode layer 16, a separator 14, as well as a second electrode layer 17, are wound up around a core tube or around a mandrel, which leaves the hole 20 when it is removed. In this embodiment of the capacitor as well, the electrode layers, in each instance, can be contacted by way of projecting conductors 50.

Figure 2A:
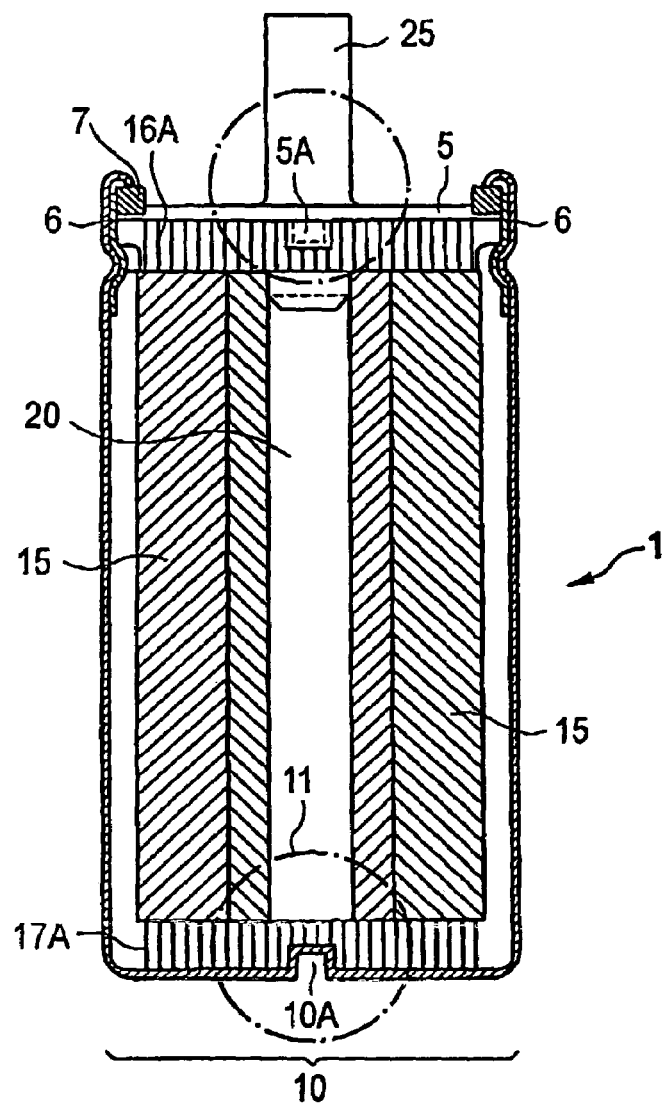
FIGS. 2A and 2B show a conventional capacitor with indentations that have a rectangular cross-section, in cross-section and in detail.
Figure 2B:
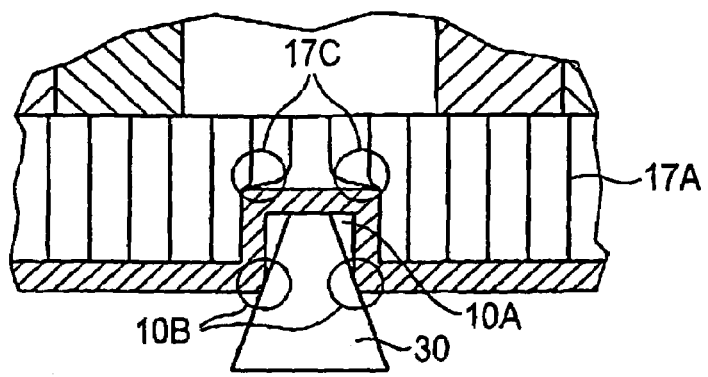

FIG. 2A shows another embodiment of a capacitor having a conventional housing. It can be seen that a capacitor winding 15 is introduced into the housing 1, whereby the hole 20 that remains after removal of the core tube or the mandrel is located in the center of the capacitor winding 15. The lid 5 with the electrical connector 25 has an indentation 5a that is directed inwards and is rectangular in cross-section and contacts the projecting regions 16a of the second electrode layer 16. The capacitor lid therefore has the potential of the first electrode layer applied to it. In the housing bottom, there is a second indentation 10a, which is also rectangular in cross-section, whereby the latter contacts the projecting regions 17a of the second electrode layer 17. The housing cup therefore has the potential of the second electrode layer applied to it. For electrical insulation, an electrical insulation 6 is located between the housing cup and the lid. Furthermore, a sealing ring 7 is present. In FIG. 2B, the circle designated as 11 in FIG. 2a can be seen on a larger scale. It is evident that the second indentation 10a, in this case, has only a very small contact area 17C with the projecting regions 17A of the second electrode layer 17, because of the rectangular cross-section. Furthermore, the cone 30 of a laser beam is shown schematically. It is clearly evident that the outer edges 10B of the indentation 10A project into the laser cone 30 and thereby reduce the energy input of the laser into the indentation. Because of this reduction in energy input, the connection between the indentation 10A and the contact area 17C with the projecting regions 17A of the second electrode layer is not so good during welding.

Figure 3A:
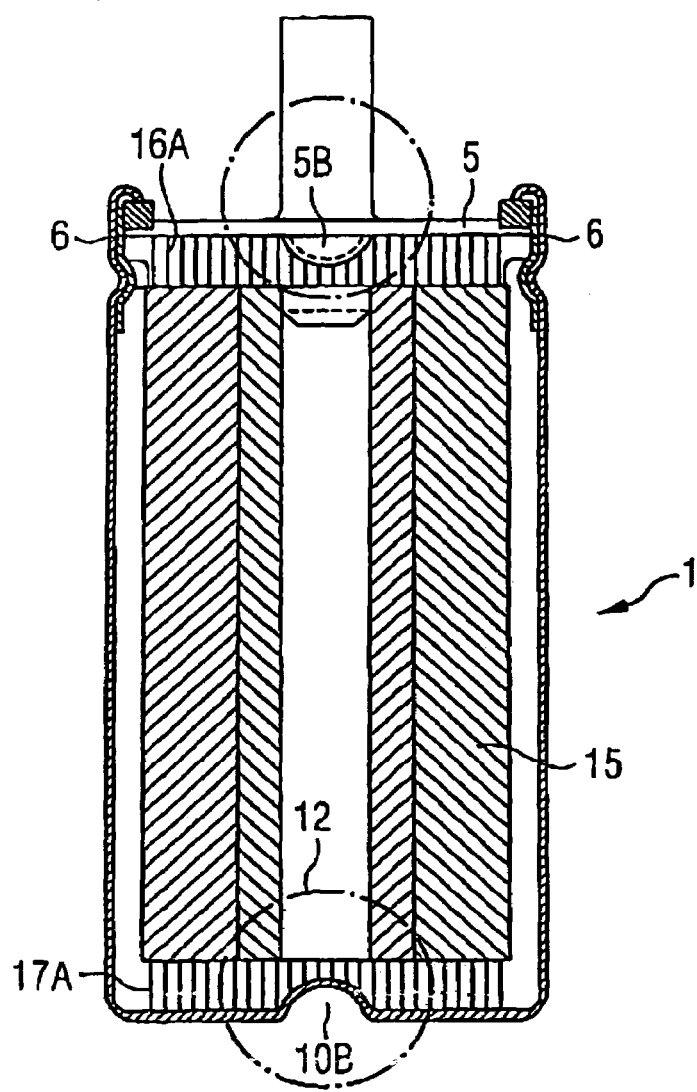
FIGS. 3A and 3B show a capacitor with a housing according to the invention, in cross-section and in detail.
Figure 3B:
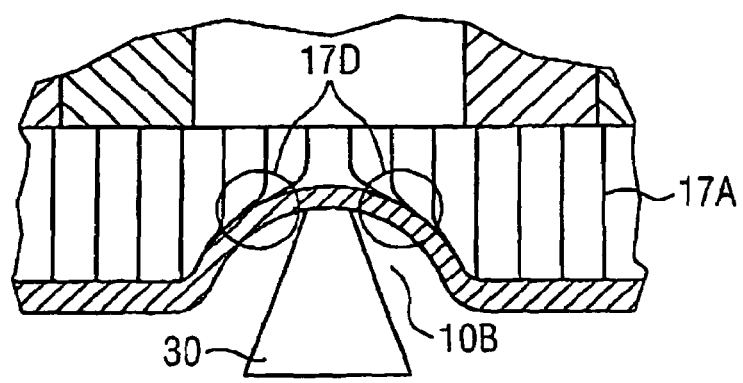

FIG. 3A shows a capacitor having a housing according to the invention. Both in the lid 5 and in the bottom of the cup there are indentations 5B and 10B, respectively, which are directed inwards. Both indentations have a cross-section that narrows towards the inside. In FIG. 3B, the circle designated as 12 in FIG. 3A is shown on a larger scale. It can be seen that because of the narrowing cross-section of the indentation 10B, particularly large contact areas 17D between the indentation and the projecting regions 17A of the second electrode layer 17 are the result. In this arrangement, the projecting regions of the electrode layers can be turned over at the contact point in such a manner that possibly two or more electrode layers lie on top of one another and are compressed so that particularly good contact between the indentation and the electrode layer is the result. Furthermore, it is clearly evident that a cone-shaped laser beam 30 that is shown schematically here is not weakened by the edges of the indentation, so that a particularly good energy input of the laser beam becomes possible and therefore a particularly good weld between the indentation and the contact points 17D with the projecting regions of the electrode layer is possible.

Figure 4A:
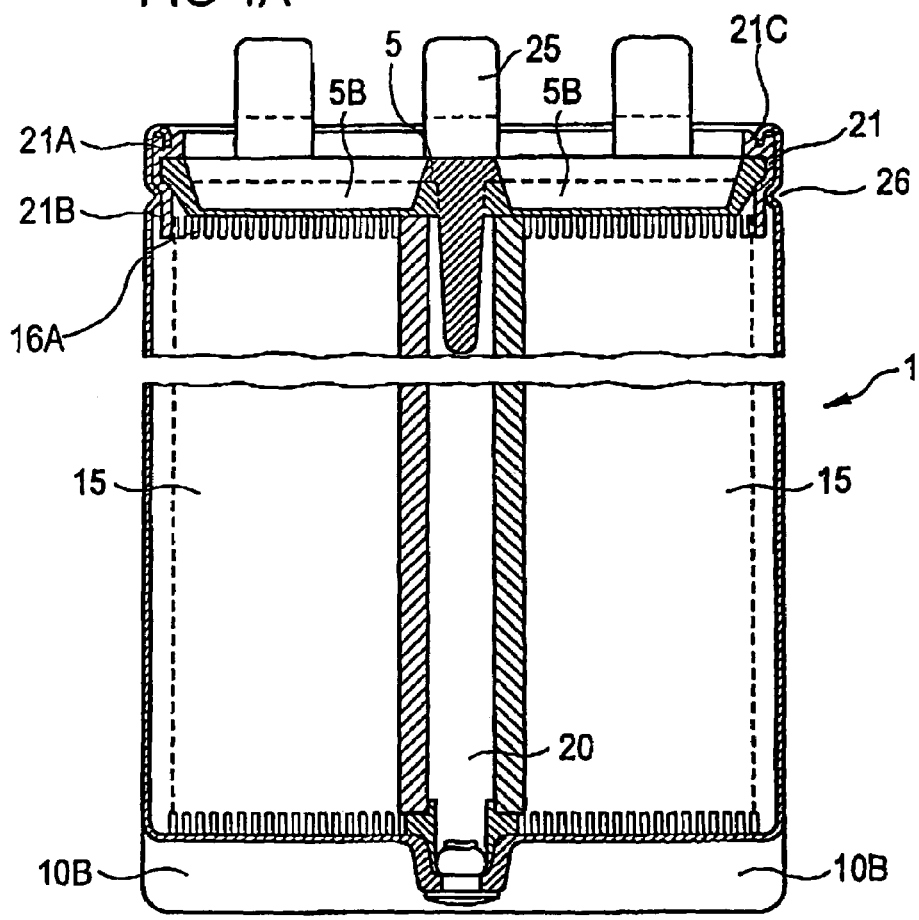
FIGS. 4A and 4B show a capacitor with another variant of a housing according to the invention, in cross-section and in a top view.

FIG. 4A shows a capacitor with another variant of a housing according to the invention. It can be seen that in this case, the indentations both in the lid and in the cup bottom are formed to be elongated. Because of this special shape of the indentations, a particularly large contact area between the indentations and the electrode layers is the result. Furthermore, an electrically insulating component 21 is present. This component 21 is arranged between the lid 5 and the wall of the housing 1, in sealed manner, and thereby at the same time insulates the lid electrically from the housing, and seals the housing. First regions 21 A of the electrically insulating component are arranged outside the housing interior, circumferentially around the lid, and have a notch 21C into which the edge of the housing is turned over. Therefore it is possible to implement particularly easy flanging by means of the electrically insulating component 21. Furthermore, second regions 21B of the electrically insulating component are present in the interior of the housing, which regions are arranged between the wall of the housing and the projecting edge regions 16A of the first electrode layer. These regions 21B insulate the projecting edge regions of the electrode from the housing in a particularly simple manner. A circumferential indentation 26 in the form of a bead is formed in the wall of the housing, which bead in addition fixes the electrically insulating component 21 in place.

Figure 4B:
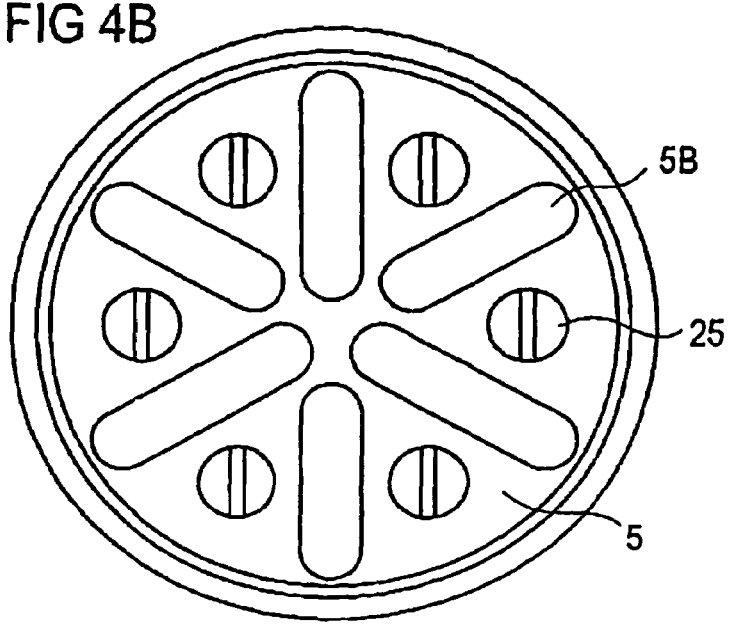

In FIG. 4B, the lid of the housing shown in FIG. 4A can be seen in a top view. It is evident that six indentations 5B, arranged in star shape, are present in the housing lid, which indentations can produce a particularly intimate contact with the electrode layer. Furthermore, one or more electrical connectors 25 are formed on the housing.

The invention is not limited to the exemplary embodiments shown here. Other variations are possible, both with regard to the number of indentations in the housing and with regard to their form. The electrodes that are contacted by means of the indentations can also be configured differently. Thus, for example, not only the layer stacks shown but also windings or electrodes configured in another manner are possible.

What is claimed is:

1. A housing for an electrochemical cell having at least a first electrode and a second electrode, the housing comprising:
   a lid having a first indentation to contact the first electrode; and
   a bottom having a second indentation to contact the second electrode;
   wherein the first indentation has a first cross-section and the second indentation has a second cross-section, the first cross-section and the second cross-section getting narrower as the first indentation and the second indentation progress into an interior of the housing.

2. The housing of claim 1, wherein the first indentation and the second indentation extend in substantially a straight line over the lid and the bottom, respectively.

3. The housing of claim 1, wherein the bottom and the lid are part of separate components.

4. The housing of claim 1, wherein the housing comprises aluminum or aluminum forging alloys.

5. The housing of claim 1, further comprising:
   an electrically insulating component that is at least partly around an edge of the lid and that is between the lid and a wall of the housing.

6. The housing of claim 5, wherein first regions of the electrically insulating component are arranged around a circumference of the lid and outside of an interior of the housing, the first regions having a notch; and
   wherein an edge of the housing is turned towards an interior of the housing around the lid such that the edge is within the notch.

7. The housing of claim 5, wherein the electrically insulating component comprises rubber.

8. A capacitor comprising:
   a housing comprising:
      a lid having a first indentation, the first indentation having a first cross-section that gets narrower inside the housing; and
      a bottom having a second indentation, the second indentation having a second cross-section that gets narrower inside the housing; and
   a layer stack that comprises a first electrode layer and a second electrode layer, the layer stack having faces that are substantially opposite the lid and the bottom;
   wherein an edge of at least one of the first electrode layer and the second electrode layer extends out of a face of the layer stack and is bent at contact points with at least one of the first and second indentations.

9. The capacitor of claim 8, wherein contact points between at least one of the first and second indentations and a corresponding electrode layer are welded.

10. The capacitor of claim 8, wherein the layer stack is rolled to produce a capacitor winding.

11. The capacitor of claim 8, wherein the housing further comprises:
   an electrically insulating component that is at least partly around an edge of the lid.

12. A capacitor comprising:
   a housing comprising:
      a lid having a first indentation, the first indentation having a first cross-section that gets narrower inside the housing;
      a bottom having a second indentation, the second indentation having a second cross-section that gets narrower inside the housing; and
      an electrically insulating component that is around the lid;
   a layer stack comprising alternating electrode layers including a first electrode layer and a second electrode layer the layer stack being disposed inside the housing such that faces of the layer stack formed by outer edges of the electrode layers are substantially opposite the lid and the bottom;
   wherein an edge of at least one of the first electrode layer and the second electrode layer extends out of a face of the layer stack and is bent at contact points with at least one of the first and second indentations; and
   wherein regions of the electrically insulating component are inside the housing between a wall of the housing and a bent edge of the first electrode layer or the second electrode layer.

13. The capacitor of claim 12 wherein contact points between at least one of the first and second indentations the alternating electrode layers are welded.

14. The capacitor of claim 13 wherein the contact points are laser-welded.

15. The capacitor of claim 12 wherein the layer stack is rolled to produce a capacitor winding.

16. The capacitor of claim 12, wherein second regions of the electrically insulating component are arranged around a circumference of the lid and outside of an interior of the housing, the first regions having a notch; and wherein an edge of the housing is turned towards an interior of the housing around the lid such that the edge is within the notch.

17. The capacitor of claim 12, wherein the electrically insulating component comprises rubber.

18. The capacitor of claim 12, wherein the first indentation and the second indentation extend in substantially a straight line over the lid and the bottom, respectively.

19. The capacitor of claim 12, wherein the bottom and the lid are part of separate components.

20. The capacitor of claim 12, wherein the housing comprises aluminum or aluminum forging alloys.

* * * * *

UNITED STATES PATENT AND TRADEMARK OFFICE
CERTIFICATE OF CORRECTION

PATENT NO. : 7,016,178 B2
APPLICATION NO. : 10/507386
DATED : March 21, 2006
INVENTOR(S) : Werner Erhardt et al.

It is certified that error appears in the above-identified patent and that said Letters Patent is hereby corrected as shown below:

Column 6, Claim 13, Line 61:
Insert --and-- between "indentations" and "the"

Signed and Sealed this

Nineteenth Day of December, 2006

JON W. DUDAS
*Director of the United States Patent and Trademark Office*